(12) United States Patent
Tüschen

(10) Patent No.: US 6,634,465 B1
(45) Date of Patent: Oct. 21, 2003

(54) SPRING-LOADED BRAKE WITH WEAR INDICATION

(75) Inventor: Alfred Tüschen, Lennestadt-Saalhausen (DE)

(73) Assignee: Tüschen & Zimmermann, Lennestadt-Saalhausen (DE)

( * ) Notice: Subject to any disclaimer, the term of this patent is extended or adjusted under 35 U.S.C. 154(b) by 0 days.

(21) Appl. No.: 09/762,430

(22) PCT Filed: Aug. 18, 1999

(86) PCT No.: PCT/EP99/06046

§ 371 (c)(1),
(2), (4) Date: Mar. 13, 2001

(87) PCT Pub. No.: WO00/11369

PCT Pub. Date: Mar. 2, 2000

(30) Foreign Application Priority Data

Aug. 18, 1998 (DE) .......................................... 198 37 315

(51) Int. Cl.[7] .............................................. F16D 66/02
(52) U.S. Cl. .................................. 188/1.11 L; 188/71.1; 188/170; 188/171
(58) Field of Search ....................... 188/1.11 R, 1.11 W, 188/1.11 E, 170, 171, 71.1

(56) References Cited

U.S. PATENT DOCUMENTS

| 3,516,525 | A | * | 6/1970 | Skaggs ...................... 188/1.11 |
| 4,440,279 | A |   | 4/1984 | Schreiner |
| 4,557,355 | A |   | 12/1985 | Wilke et al. ................. 188/173 |
| 5,103,940 | A |   | 4/1992 | Meneut et al. |
| 5,255,760 | A | * | 10/1993 | Lamb et al. ................ 188/1.11 |
| 5,816,371 | A | * | 10/1998 | Buckley et al. ............. 188/170 |

FOREIGN PATENT DOCUMENTS

| CA | 985 349 A1 | 3/1976 |
| DE | 25 49 007 A1 | 5/1977 |
| DE | 28 37 494 A1 | 3/1980 |
| DE | 32 12 826 A1 | 10/1983 |
| DE | 33 00 446 A1 | 7/1984 |
| DE | 195 14 463 C1 | 10/1996 |
| DE | 196 30 779 A1 | 2/1998 |
| EP | 0 794 102 A1 | 9/1997 |
| WO | WO 96/23673 | 8/1996 |

* cited by examiner

*Primary Examiner*—Matthew C. Graham
(74) *Attorney, Agent, or Firm*—Proskauer Rose LLP

(57) ABSTRACT

The invention relates to a spring-loaded brake with a first housing part (2) connected to a first brake calliper arm (26) and a second housing part (14) connected to a second brake calliper arm (28) and with an actuation device (18), by means of which the first and second housing part (2, 14) are capable of being moved relative to one another. The air passage as well as the wear of this spring-loaded brake can be monitored reliably and in a simple manner by means of a measuring device (7, 10) which continuously monitors the change in the relative position of the housing parts (2, 14).

14 Claims, 4 Drawing Sheets

SPRING-LOADED BRAKE WITH WEAR INDICATION

Figure 1:
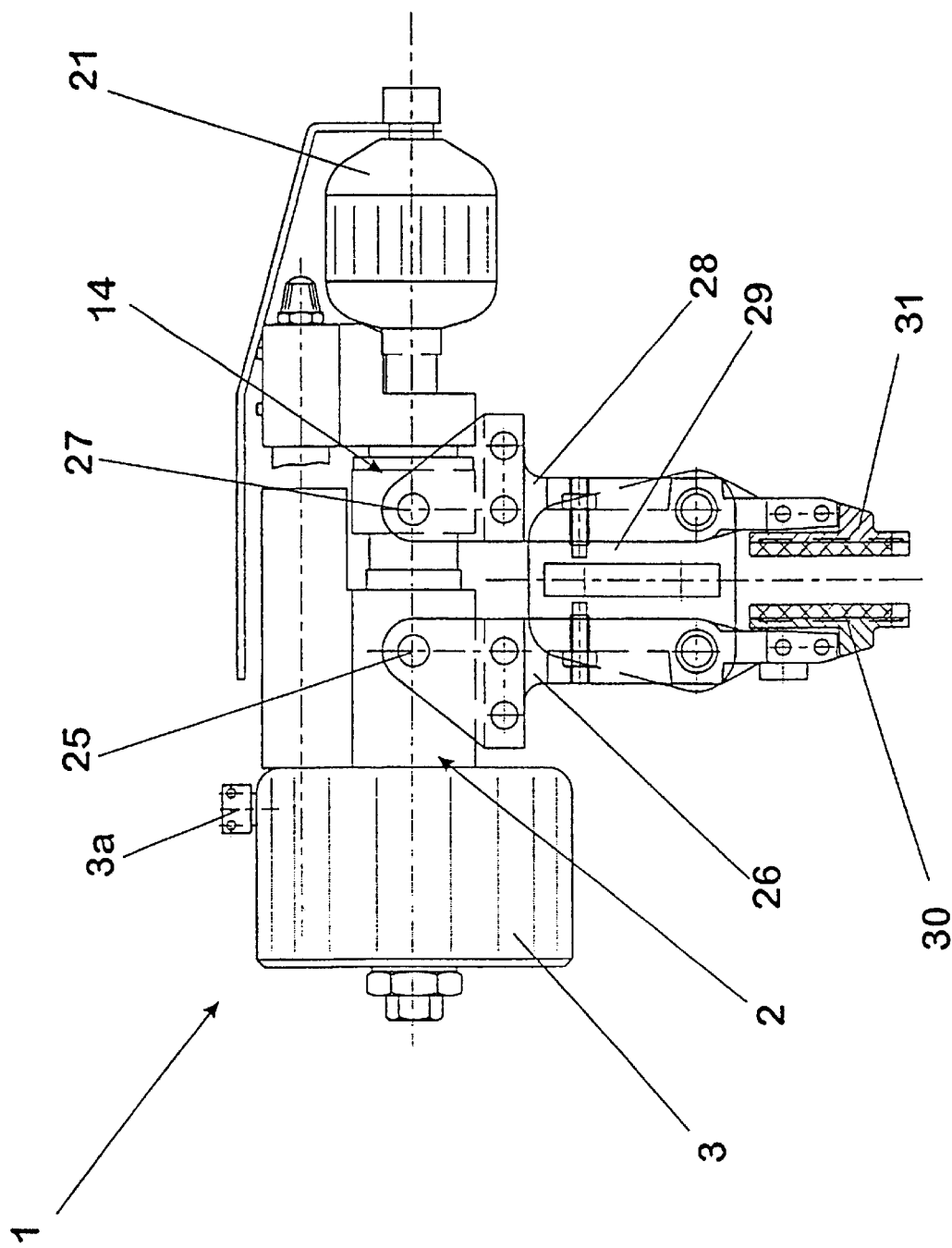

The invention relates to a spring-loaded brake with a first housing section connected to a first brake shoe and a second housing section connected to a second brake shoe and with an actuation device, by means of which the first and the second housing section are capable of movement relative to one another. Such spring-loaded brakes are used, for example, for the securing of drive trains, in order to prevent the risk that, in the event of an operational fault, the machines connected to the drive trains run uncontrolled and wild. Thus, for example, spring-loaded brakes are used in particular on conveyor belts or chain conveyors, with which bulky material mined underground, such as coal, rock, or ore, is conveyed over long transport distances. With these devices, spring-loaded brakes prevent the risk that, in the event of a failure in the drive system, the belt with the material lying on it runs back uncontrolled along the conveying stretch or starts running under its own dynamic forces.

For this purpose, known spring-loaded brakes are equipped with an actuation device, designed as a rule as a spring package, by means of which the brake shoes, mounted on bearings in a jointed manner, equipped in each case with a brake lining, will automatically be moved into the braking position in the event of the removal of a counter-force applied via the brake caliper arm.

The advantage of the known spring-loaded brakes consists of the "fail-safe behaviour" explained heretofore, by means of which it can be ensured that a braking effect will always be reliably applied even if no further external energy sources are available for creating the braking force. Problems arise, however, in that the brake linings of the brake shoes are subject to wear. This wear depends on the frequency of the braking procedures, the braking time, and the scale of the braking force taking effect in each case. With increasing wear of the brake linings, the path increases over which the housing parts must be moved against one another, in order to reach the braking position. The consequence of this is that, if a spring package is used, the braking force of the braking device likewise decreases as the wear increases. For this reason it is necessary for the wear on the brake linings to be monitored and for the tension of the spring package to be adjusted. If an excessive degree of wear is detected, the connection between the housing parts and the spring package is adjusted in such a way that the braking force lies at the maximum permissible limit value.

In order to avoid manual adjustment, the principle is known of providing for a fluid-filled pressure buffer between the actuation device and at least one of the housing parts. This pressure buffer is connected to a pressure storage vessel, in which fluid is stored under pressure. In such a system, in the event of the braking force dropping because of wear, the fluid buffer is filled up with fluid under pressure to such a degree that the reduction in braking force caused by the wear is compensated for. In this way, the decrease in braking force otherwise inherent with brake wear will be automatically compensated for, and it will be ensured that the same braking force will still be uniformly available in the event of a fault.

In order to avoid overheating of the brake disks due to the brake linings chafing them or coming in contact with them during the operation of the drive, and therefore to a large extent avoiding the risk of fire, it is necessary for the air passage of the brake linings to be monitored, so that the risk can be avoided of the machine being started with inadequately vented brakes. For this purpose, the known spring-loaded brakes are equipped with an eccentric disk, which is connected to one of the housing parts. A limit switch is provided on the other housing part, by means of which, for example, the energy supply of a motor is controlled. The eccentric disk in this situation is adjusted in such a way that the limit switch is closed and the motor supplied with energy when the spring-loaded brake is vented, i.e. is out of action. If the limit switch is not reached, the motor must be prevented from starting.

This combination of limit switch and eccentric disk does indeed allow for the control of a motor with simple and robust means. It is however impossible in this manner to monitor the wear of the spring-loaded brake reliably in such a way that, on the one hand, a signal is always received relating to the need for the brake linings to be replaced, and, on the other hand, the brake linings can also be used for an optimum period of time. In addition to this, the mechanical elements of the limit switch/eccentric disk combination have proved in practice to be prone to failure, since on the one hand they must be freely accessible for adjustment and readjustment purposes, and, on the other, they are always subject to the risk of damage due to falling material. In addition to this, the wilfully or unintentionally incorrect setting of the eccentric disk may lead to faulty function of the limit switch.

In addition to the prior art known from practice, as described heretofore, a brake caliper unit is known from DE 195 14 463 C1, of the generic type of the invention, for the disk brakes of vehicles, and railed vehicles in particular, in which one brake caliper arm is connected directly to the housing and the other brake caliper arm is connected by means of a gear system. With this known brake caliper unit, too, the problem arises of identifying wear of the brake lining in good time, and of avoiding malfunction of the brake in the event of inadequate venting.

The objective of the invention is of creating a spring-loaded brake of the type referred to in the preamble, in which the air passage and the wear can be monitored reliably and in a simple manner.

This objective is achieved according to the invention in that a spring-loaded brake of this type is equipped with a measuring device, which continually monitors the change in the relative position of the housing parts.

With a spring-loaded brake designed according to the invention, continuous monitoring of the relative position of the housing parts can be effected. In this way, information is always available from which can be derived, on the one hand, the air passage which is covered in each venting procedure, and, on the other, the current state of wear of the brake linings in each case. This makes it possible, with low technical effort, to make an assessment at any time of the air passage, the state of wear, and, inherently associated with this, of the functionality of the spring-loaded brake. It is accordingly possible to display, with a high degree of reliability, the position of the brake shoes in the vented state. With equally high precision, the moment of time can also be determined at which the replacement of the brake linings is in fact required.

By means of the continuous acquisition of the relative position of the housing parts, made possible by the invention, assessments can be made of the effective size of the air passage covered during each venting procedure. These signals form the basis for the generation of control signals for the operation of the drive system connected to the brake equipped according to the invention. If it is ascertained, for example, that the air passage is too small, the drive is not allowed to start up. On the other hand, the risk pertains that overheating of the brake may occur due to chafing brake shoes. If it is ascertained, by contrast, that the air passage is too large, this means that a readjustment of the air passage limits must be carried out.

In the braked position, too, the measuring device provided for according to the invention supplies a signal which is important for the assessment of the operational state.

For example, it is possible to conclude from the position of the brake caliper arms, determined by means of the measuring device in the braked position, whether the brake shoes of the brake are showing sufficient strength.

It is no longer necessary to make an adjustment of the measuring device after each replacement of the brake shoes, since the "zero state" in which the housing parts are located relative to one another after brake shoe replacement can be automatically determined. In this way it is assured that no error function arises during monitoring due to faulty basic settings.

Because of the possibility of continuous determination of the positional changes of the housing parts, it is also no longer required to make regular checks of the functional performance of the measuring device by way of a visual inspection, or to carry out adjustments on mechanical components. Instead of this, the measuring device can be arranged with no problem at a protected location in such a way that mechanical damage by external forces can be avoided.

This applies in particular in situations in which the measuring device comprises a measuring rod, featuring contacts which are actuated by the effects of a magnetic field, this rod being coupled to the first of the housing parts and being capable of movement by a magnetic field, this magnetic field being created by a device connected to the second housing part, whereby the device creating the magnetic field and the measuring rod are capable of movement relative to one another. The rod and the device creating the magnetic field serve in this situation to determine changes in position, and are robust components, not prone to faults and free of maintenance, which, if space is limited, can be arranged in a secure and protected manner in housing sections of the housing parts.

With such embodiments of the spring-loaded brake according to the invention, in which provision is made for a manually-adjustable or automatic device for wear compensation, the actual wear of the brake can be determined from the information derived from the continuous monitoring of the relative position of the housing parts. Accordingly, it is possible to determine the beginning and end of the air passage which is covered for releasing the brake, every time the device which is braked by the brake is taken into operation. It is true that the braking force does not change because of the wear compensation, but the wear always results in a change in the position of the start point of the air passage. These points can be determined and evaluated with no problem with spring-loaded brakes designed according to the invention, with the result that, even with wear-compensated brakes, an effective and continuous check is possible on the state of the spring-loaded brake.

An embodiment of a spring-loaded brake according to the invention, suitable for practical application, and operating with a high level of operational reliability, is characterised in that the actuation device exercises an elastic force, which automatically moves the housing parts into a relative position, in which the brake caliper arms with the brake shoes are in their braking position.

In this situation, a further development of this embodiment, likewise to the purpose, is characterised in that a venting device is provided for, which, when force is applied, brings the housing parts into a relative position, against the force of the actuating device, in which the brake caliper arms with the brake shoes are without effect. This venting device operates for preference hydraulically or pneumatically, since with such a mode of operation, substantial forces can be generated in an operationally safe manner, especially underground, without the risk inherent with the use of high electrical energy values.

In the event of a hydraulically or pneumatically-actuatable venting device being present, the device can be controlled by means of a valve combination, which features a inflow passage for the inflow of pressure fluid when force is applied, and an outflow passage for the outflow of pressure fluid. It is to advantage in this connection if a choke is arranged in the outflow passage of the valve combination, the choke effect of which is capable of being altered. By a suitable adjustment of the choke, the time can be changed at which the pressure fluid escapes from the venting device at depressurisation. In this way, a desired closing time for the spring-loaded brake can be set. Accordingly, for example, a high choking effect of the escaping pressure fluid has the effect of prolonging the closure time, while a slight choking effect of the escaping air results in a rapid closure of the brakes. The valves and all other operational states of a spring-loaded brake according to the invention can of course be controlled manually. In order to achieve automatic control, however, a control device should for preference be provided for which controls the valve combination as a function of control signals.

An especially compact design form of a spring-loaded brake according to the invention is derived if the valve combination is carried by one of the housing parts.

A further embodiment of the invention, which substantially improves the availability and operational reliability of a spring-loaded brake according to the invention, is characterised in that an evaluation device is provided which evaluates the measurement signal delivered by the measuring device. This evaluation device can be used for ongoing monitoring of the functional performance of the spring-loaded brake. In particular, it is possible with the evaluation device to determine automatically the state of wear of the brake. In this situation, the evaluation device makes use of the measured values which are constantly provided by the measuring device. The measured signals provide information about the wear state of the brake linings, when the evaluation device determines the path covered between a start and end position of the housing parts during a braking or venting procedure of the spring-loaded brake. The longer this path, the further the wear of the linings has progressed.

It is just as much to the purpose if the evaluation device, as am alternative or as a supplement, determines the time which the housing parts require, during a braking or venting procedure, to reach their start or end position. The length of the time interval which elapses from the start of the spring-loaded brake moving apart or closing respectively provides a direct indication of the state of the brake as a whole. Accordingly, it must be assumed that there is a defect in the venting device if the venting device requires more time for venting than a maximum permitted duration. Likewise, it can be assumed that there is a defect in the actuation device if the automatic closure of the brake does not take place within a specific time. As a result, it is favourable if the evaluation device compares the result of each individual evaluation with a reference value allocated to this result, and issues a signal as a function of the outcome of the comparison. In consideration of the often rough and changeable external influences, and the conditions they induce, under which spring-loaded brakes according to the invention are used, it is to the purpose in this connection if the evaluation device does not issue a signal indicating a fault until the result of the evaluation deviates from the reference value allocated to this result, and taking a tolerance range into account.

A simple examination of the operational and wear state of a spring-loaded brake according to the invention can be achieved if the evaluation device is coupled to a display device, which issues a visual or audible signal as a function of the signal issued by the evaluation device. It is of course equally possible for the signals of the evaluation device to be transferred to a central monitoring and control point.

Inasmuch as the evaluation device is carried by one of the housing parts, a compact structural unit is provided, which need only be connected to a few non-sensitive supply leads and, if applicable, signal transfer leads. This applies in particular if the valve combination for controlling the venting device is also arranged on a housing part.

The closing behaviour of a spring-loaded brake according to the invention can be determined in a simple fashion in that, in the presence of a control device, a valve combination, and an evaluation device, the control device controls the valve combination as a function of signals from the evaluation device. It is to advantage, in this connection, if the venting device is capable of being brought into a second operational state by means of an actuator which is capable of being activated independently of the control device. Such an actuator can, for example, activate a slide valve, in one position of which pressure fluid escapes from the venting device, while in its other setting pressure fluid flows into the venting device. The manually actuatable device makes it possible, during maintenance work, for the brake to be opened and closed independently of the signals from the control device.

In addition to this, it is possible for the closure and/or air behaviour of a brake according to the invention to be adjusted by the actuator, operating independently of the control device. This is made possible, according to the invention, by the evaluation device storing as a reference value the time determined, in the event of manually-induced opening, for the depressurisation of the venting device which then takes place. This reference value is then retained for all subsequent closure procedures until a new reference value is presented. With this embodiment of the invention, the unit formed from the measuring device, the evaluation device, and the control device, operates in the manner of a learning system, which can be adapted with the greatest possible flexibility to the most widely differing braking tasks. In this situation the simple adjustability of the closure time described has proved to be especially advantageous in situations in which conveyor belts of considerable length, such as are encountered underground, are intended to be braked by several spring-loaded brakes according to the invention, spaced at intervals from one another. If the braking is carried out in cascade fashion with temporal delay, the belts can be braked in a gradual and progressive manner with temporal displacement, in their direction of conveying. In this way, the risk can be avoided, which would otherwise pertain, of the belts buckling because of their individual kinetic energy in each case.

A further improvement in the operational reliability and behaviour of a spring-loaded brake according to the invention can be achieved in the event of a fault in that a pressure monitoring device is provided for, which monitors the pressure of the pressure fluid, which is contained in a supply line providing the venting device with pressure fluid. In the event of a loss of pressure, such a pressure monitoring device issues an alarm signal, which will, for example, prevent the attempt being made of venting the spring-loaded brake with an insufficient pressure of the pressure medium.

An embodiment of the invention which has proved to be particularly important in practice is characterised in that the evaluation device comprises a signal generator, the signal from which sets an initial state. The possibility of setting an initial state as a function of a corresponding signal is of significance, for example, if after maintenance work the state of the spring-loaded brake is to be readjusted, and, inherent in this, the reference points have changed for the values monitored by the measuring device. Inasmuch as the evaluation device is brought into a specific state by a signal, in which the current reference points in each case are set as starting point values for the measurements and evaluations carried out subsequently, it is in principle possible for every operational state of the spring-loaded brake to be defined as an initial state. This makes it possible on the one hand to achieve versatility of use and easy adaptation of the evaluation device to the most widely differing operational conditions; on the other hand, this will also ensure that the measurement and evaluation are always carried out under optimum peripheral conditions in respect of reproducibility.

It is also favourable in this connection if the evaluation device comprises a switch which is capable of actuation without being touched, and which, on actuation, generates the relevant signal for setting the initial state. Such a switch makes it possible, in a simple manner, to prevent impermissible outside intervention, in that it is installed with a cover in a housing of the evaluation device, and is actuated by an actuation force taking effect from outside, without touch. This can be achieved, for example, if the switch comprises a switching element which is magnetically sensitive.

If provision is made for the evaluation device to be capable of being set into an initial state by means of a signal, this should only be possible if the spring-loaded brake or the device braked by the spring-loaded brake is in a certain specific operational state. In this way it is possible to prevent the risk of a spring-loaded brake in a threadbared state being further operated by manipulations.

Figure 2:
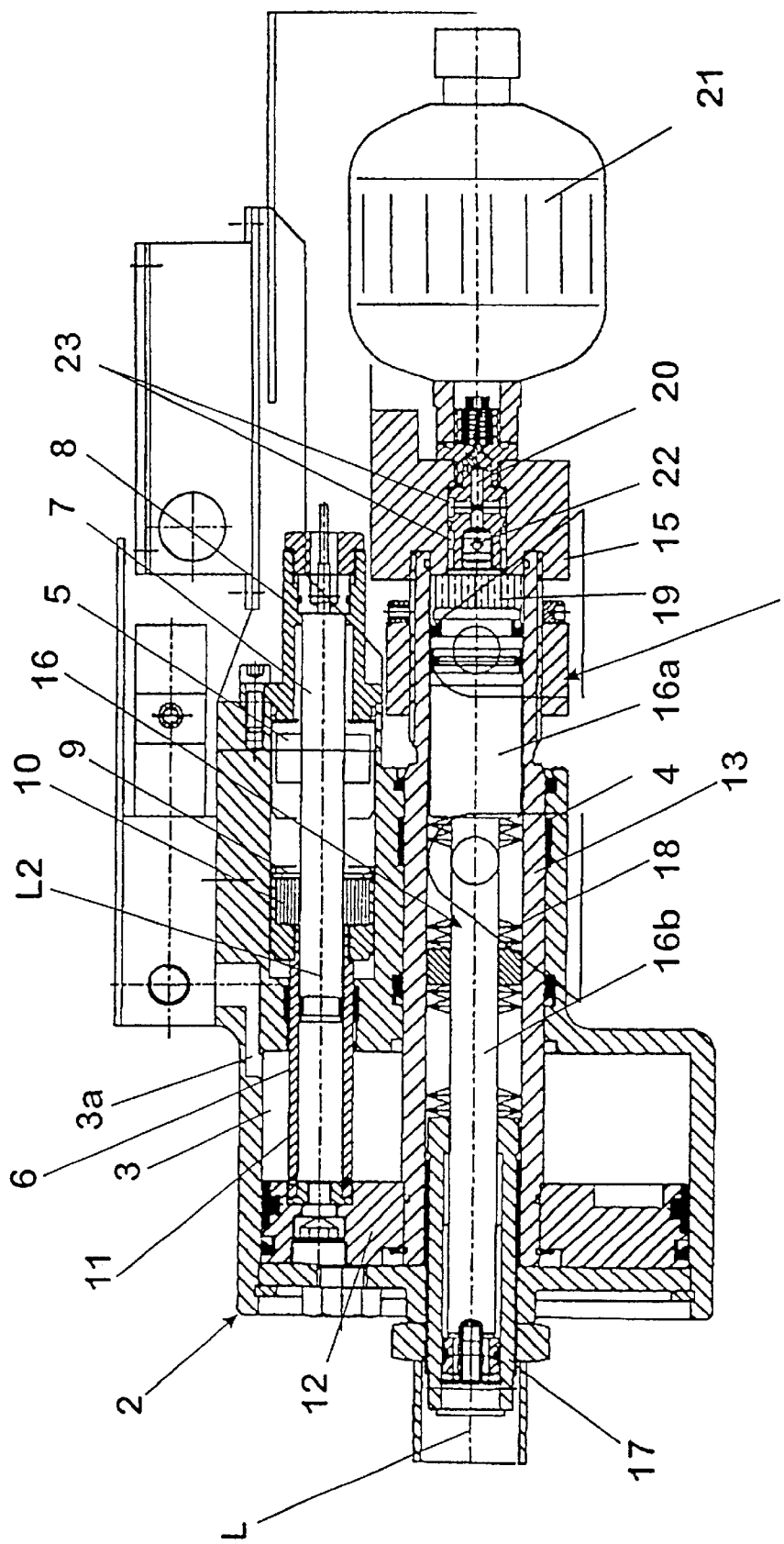
Figure 3:
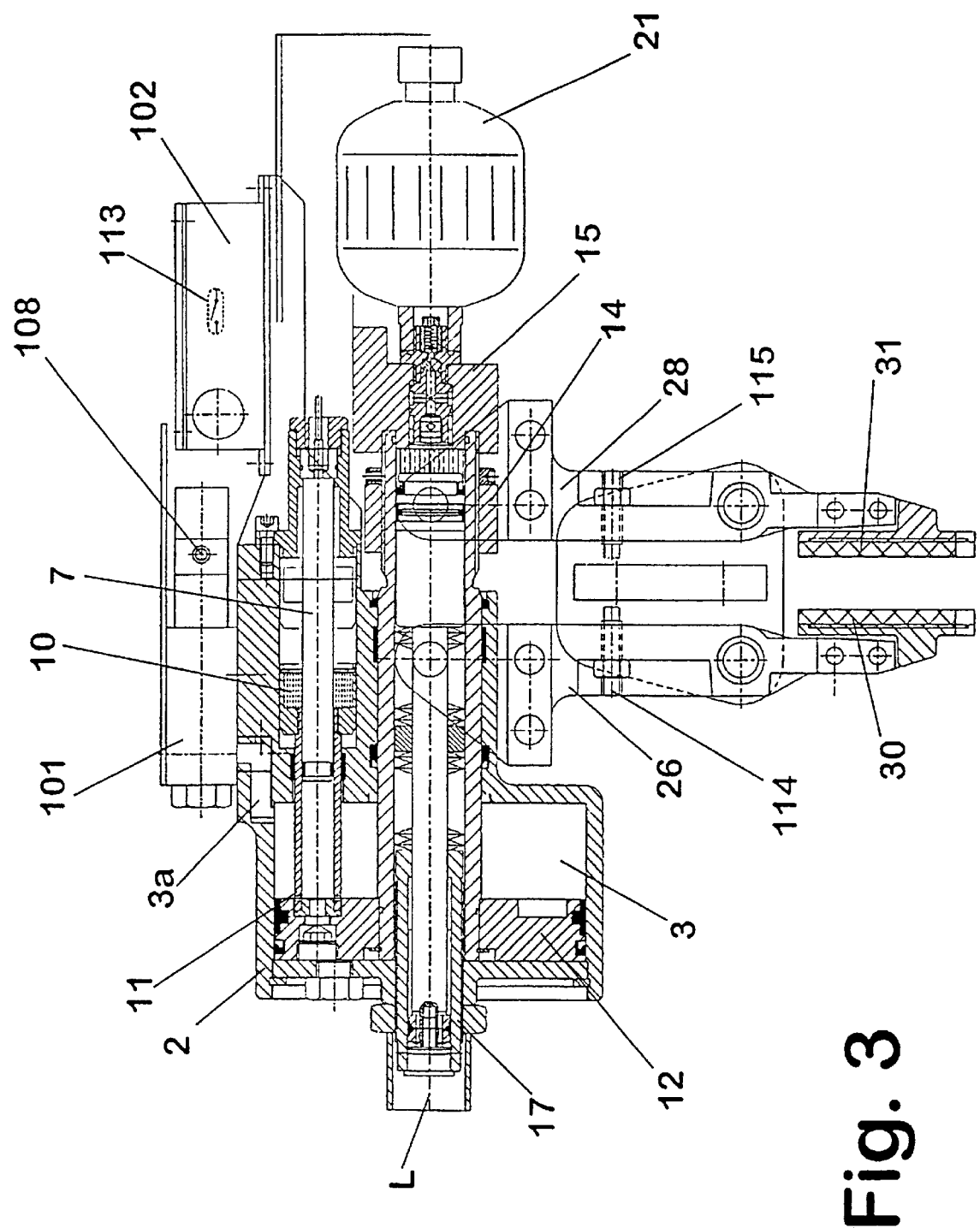
Figure 4:
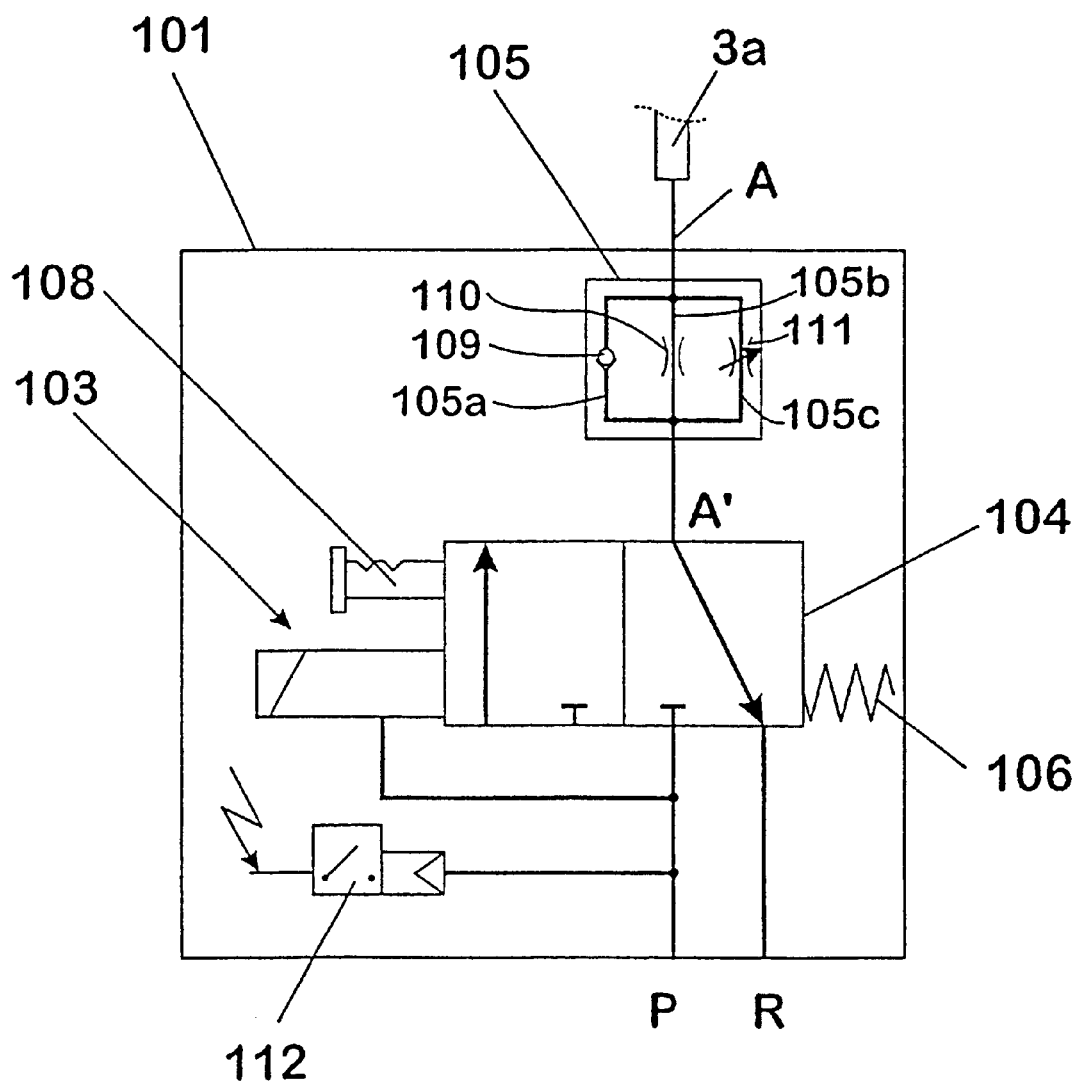

Further advantageous embodiments of the invention are described in the dependent Claims, and are described in greater detail hereinafter on the basis of drawings representing embodiments. These show, in schematic form:

FIG. 1 A spring-loaded brake in a side view;

FIG. 2 The spring-loaded brake according to FIG. 1 in a sectional view along the longitudinal section;

FIG. 3 An embodiment of the spring-loaded brake according to FIG. 1, in a longitudinal section;

FIG. 4 A valve combination used with a spring-loaded brake according to FIG. 3, in a schematic representation.

In the figures identical structural elements are provided with the same reference numbers.

The spring-loaded brakes 1 and 100 respectively, represented in the figures, feature in each case a first housing part 2, which in turn features an air chamber 3, arranged coaxially to the longitudinal axis L of the housing part 2, and a cylinder aperture 4 connected to this, likewise arranged coaxially to the longitudinal axis L. The diameter of this cylinder aperture is less than the diameter of the air chamber 3. In addition to this, a chamber 5, likewise cylindrical in shape, is formed in the housing part 2, this chamber extending axially parallel to the longitudinal axis L of the housing part 2. The chamber 5 is connected to the air chamber 3 by means of an aperture 6 positioned coaxially to the longitudinal axis L2 of the chamber 5. Adjacent to the aperture 6, a pressure supply line 3a opens into the air chamber 3. The pressure supply line 3a is connected to a pressure generating device, not shown, with which compressed air can be introduced under pressure into the air chamber 3 to vent the spring-loaded brake 1 or 100 respectively. In this way a venting device is formed with which the spring-loaded brake 1 or 100 respectively can be moved from its closed position into an opened position.

Arranged coaxially to the longitudinal axis L2 of the chamber 5 is a measuring rod 7, which is clamped securely in the housing part 2, at the end 8 of the chamber 5 located opposite the aperture 6. The measuring rod 7 comprises a plurality of contacts, not shown individually, arranged behind one another in the longitudinal direction of the rod, these contacts being switched under the influence of a magnetic field. In this situation, the length of the measuring rod 7 is dimensioned in such a way that its end allocated to the air chamber 3 is positioned at the output of the aperture 6 on the air chamber side.

At the same time, the measuring rod 7 is guided through the aperture 9 of a magnetic field generating device 10, which is mounted in a displaceable manner on bearings in the chamber 5. The magnetic field generating device 10 is connected to a piston 12, by means of a sleeve-shaped connecting element 11, surrounding the measuring rod 7 in the direction of the air chamber 3, the piston being capable of displacement inside the air chamber 3 coaxially to the longitudinal axis L.

The piston 12 is guided by a sleeve-shaped piston tube section 13, located in a displaceable manner in the cylinder aperture 4, and forming part of a second housing part 14 of the spring-loaded brake 1, 100. The housing parts 2 and 14 are in this way guided so as to be movable coaxially to the longitudinal axis L and relative to one another.

The measuring rod 7 and the magnetic field generating device 10 are parts of a measured value acquisition device, which also comprises an evaluation and display device, not shown in the example of FIGS. 1 and 2. The measured value acquisition device detects the change in the switching state of the contacts of the measuring rod 7, caused by the movement of the magnetic field generating device 10 in relation to the measuring rod 7, and determines from this the path covered by the measuring rod 7 relative to the magnetic field generating device 10, which accords with the change in the relative position of the housing parts 2, 14.

The advantage of the coaxial and axis-parallel arrangement respectively of the housing parts 2, 14, of the chamber 5 and the measuring rod 7 lies in the fact that in this way a compact design can be achieved for the spring-loaded brake 1, 100, which simultaneously allows for optimum protection for the individual components against damage from the outside.

The piston tube section 13 of the housing part 14 is connected at its end turned away from the piston 12 to a valve and line block 15, and surrounds a spring guide bolt 16, mounted in it and capable of axial displacement, this bolt being likewise arranged coaxially to the longitudinal axis L of the housing parts 2, 14. The guide bolt 16 features a head section 16a, allocated to the valve and line block 15, the diameter of the bolt corresponding to the internal diameter of the piston tube section 13. In the direction of the piston 12, a longer rod-shaped section 16b connects to the head section 16a, the end of this rod-shaped section which is turned away from the head section 16a being mounted in a sleeve 17 of the first housing section 2 in a displaceable manner.

The rod-shaped section 16b of the spring guide bolt 16 forms the guide for a disk spring packet 18, representing an actuation device, which is tensioned between the sleeve 17 and the head section 16a of the spring guide bolt 16.

Between the valve and line block 15 and the end face of the head 16a of the spring guide bolt 16 allocated to the block, a fluid buffer 19 is connected, which in turn is connected by a central line 20 of the valve and line block 15 to a pressure storage vessel 21. In the pressure storage vessel 21 an incompressible fluid, such as an oil, is stored and subjected to pressure.

By means of a non-return valve 22 in the valve and line block 15, connected into the central line 20, the flowing of the fluid from the fluid buffer 19 flowing to the pressure storage vessel 21 is prevented. In front of the non-return valve 22 and behind it, the beginning and end of a bypass line 23 opens into the central line 20. As a function of the position of a valve, not shown, connected into the bypass line 23, the non-return valve 22 can be bypassed, in order to press the fluid buffer 17 back into the pressure storage vessel 21 by the actuation of the venting device.

On the outside of the first housing part 2 a jointed journal 25 is arranged, which forms the pivot axis for a first brake caliper arm 26.

Likewise arranged at the second housing part 14 is a jointed journal 27, mounted on which is a second pivotable brake caliper arm 28.

By means of a joint element 29, the brake caliper arms 26, 28 are also connected to one another in a jointed manner in such a way that the movement of the housing parts 2, 14 into one another causes the brake linings 30, 31, carried by the brake caliper arms 26, 28, to pivot outwards from one another, while the movement of the housing parts 2, 14, apart from one another causes the brake caliper arms 26, 28, to be brought into their braking position.

With the spring-loaded brake 1 represented in FIGS. 1 and 2, to set in motion a machine, not shown, which is at a standstill and braked by the spring-loaded brake 1, the air chamber 3 is subjected via the pressure supply line 3a to compressed air used as the pressure fluid. The piston 12 is moved in this situation into the position shown in FIG. 2, so that the housing part 14 and the housing part 2 are moved into one another. In this situation, the start and end points of the air passage are determined by the evaluation device, on the basis of the measurement signal deriving from the movement of the magnetic field generating device 10 in relation to the measuring rod 7. If these points are displaced, in relation to their position in the as-new condition of the brake linings 30, 31, outside a maximum permissible range, then the evaluation device issues a warning signal via its display device.

In the event of a fault, the air chamber 3 is relieved of pressure in a sudden manner, so that the housing parts 2, 14, are automatically moved apart from one another by the spring force of the disk spring package 18, until the brake shoes 30, 31, are in the braking position. In this position, the machine is braked by the force of the disk spring package 18.

If, due to wear, the pressure of the fluid buffer 19 is less than the pressure of the fluid contained in the pressure storage vessel 21, the fluid buffer will be topped up by the fluid flowing in through the central line 20. In this way the wear on the brake linings 30, 31 will be automatically compensated for.

The spring-loaded brake 100 shown in FIG. 3 operates basically as shown in FIGS. 1 and 2. In addition to this, however, it also presents the following features and functions:

The housing part 2 of the spring-loaded brake 100 carries on its upper side a valve combination 101 and an evaluation device 102, which comprises a control device. The valve combination 101 is designed to be of the nature of a 3/2-way valve, and has a connection A, to which the compressed air connection 3a of the air chamber 3 of the spring-loaded brake 100 is connected, a compressed air connection P, and an outflow outlet R.

The valve combination 101 itself is formed from a main valve 104, actuated by a pilot valve 103, and a controllable choke non-return valve 105. The choke non-return valve 105 is connected between the connection A of the valve combination 101 and the third connection A' of the main valve 104, next to the compressed air connection P and the outflow output R. Both the pilot valve 103 and the choke non-return valve 105 are connected by control lines, not shown, to the control outputs, likewise not shown, of the control device of the evaluation device 102.

The pilot valve 103 features an electro-magnetically actuatable actuator drive, not individually shown, which, under electrical excitation, displaces a valve slide element, likewise not shown individually, in such a way that the inflow passage of a working piston, likewise not shown individually, is cleared. In this position of the working piston, the compressed air connection P of the valve combination 101 is connected with its connection A. When the electrical energy is switched off, the electromagnetic actuator drive becomes ineffective, with the result that the inflow passage of the working cylinder is closed and the working cylinder is relieved of compressed air. The working piston is then brought back into its position of rest by a resetting spring 106, in which the connection A of the valve combination 101 is connected to its outflow outlet R.

The valve slide element, not shown, in addition to actuation by the pilot valve 103, can also be moved manually by means of an actuator device 108 into its operational positions. The actuator device 108 in this situation goes beyond the electro-magnetic actuation of the pilot valve 103, with the result that the valve combination 101 can be manually actuated in its full functional scope.

The choke non-return valve 105 comprises three passage channels 105a, 105b, 105c, connected in parallel, by means of which the connection A' of the main valve 104 is connected to the connection A of the valve combination 101. In the first passage channel 105a a non-return valve 109 is arranged, which is opened with the compressed air flowing in the direction of the output A. In the second and third passage channel 105b, 105c, a choke element 110, 111 is located in each case.

The choke effect of the choke 111 can be altered by changing its clear flow cross-section, by means of an actuator drive unit, not shown here. If required, the actuator drive unit of the choke 111 is likewise connected for this purpose with the control device of the evaluation device 102. The choke effect of the choke 110, by contrast, is determined permanently at manufacture.

The pressure of the compressed air pertaining in the compressed air connection P is monitored by a pressure monitoring device 112. This comprises a switch, not individually shown, which under sufficiently high pressure is in an open state. If the pressure in the compressed air connection P falls below a minimum value, the switch closes and the pressure monitoring device 112 issues an alarm signal to the evaluation device 102 and/or a central control device, not shown.

In order to set the evaluation device 102 into an initial state, in which, for example, the current positions in each case of the housing parts 2, 14, relative to one another are set as reference values for the measurements and evaluations during the subsequent operation, the evaluation device 102 is equipped with a switch 113. The switch 113 is arranged in the housing of the evaluation device 102, covered over and invisible from the outside. It is equipped, in the manner of a reed contact, with a magnetically-sensitive switching element, which changes its switching position under the effect of a magnetic force. Accordingly, the switch 113 can, by means of a magnet arranged on the outside of the housing of the evaluation device 102, be brought into a switching position in which it issues a signal for setting the initial conditions from which the evaluation device 102 thereafter proceeds.

The setting of the initial conditions is required, for example, if the brake shoes have been replaced or other parts subject to wear have been readjusted or replaced. In this case, the spring-loaded brake 100 is moved manually into the brake position, and the relative position of the housing parts 2, 14, then measured, are stored as reference values for the further evaluation. In order to delete this stored value, an appropriately powerful magnet is placed on the outside of the evaluation device 102, so that the switch 113 closes. The closing of the switch 113 issues a signal which causes the evaluation device 102 to store the current relative position of the housing parts 2, 14, as the initial state, starting from which the measurements and evaluations in the further operation of the spring-loaded brake 100 are carried out.

In this situation, the setting of the initial conditions only takes place when the evaluation device 102 has determined, by a comparison of the current relative position of the housing parts 2, 14, with a minimum value already stored in it, that the wear limit has not yet been reached, and proper operation of the spring-loaded brake 100 is still possible.

To adjust the limitation of the path covered during an air procedure, setting screws 114, 115, are provided for. During the air setting procedure, the setting screws 114, 115, centre the position of the brake shoes 30, 31, in relation to the brake disk, and provide for an optimum spacing between the brake shoes 30, 31, and the brake disk.

To vent the spring-loaded brake 100, the main valve 104 is actuated in the manner described, via the pilot valve 103, so that compressed air flows unrestricted from the compressed air connection P via the opened non-return valve 109 of the choke non-return valve 105, to the connection A of the valve combination 101, and from this into the air chamber 3. If, by contrast, the pilot valve 103 is switched off and the connection between the connection A and the outflow output R of the valve combination 101 is established by the main valve 104, in the manner described, then the non-return valve 109 provides a block. The size of the volume flow of the air flowing out of the air chamber 3 is therefore determined only by the chokes 110 and 111. In this situation, the opening of the choke 110 which has been determined will ensure that the closure of the spring-loaded brake 100 will take place, even if the adjustable choke 111 is completely closed because of a defect or an incorrect setting or adjustment. The adjustment of the flow cross-section of the chose 111 can shorten the time for the closure process (large flow cross-section of the choke 111) or extend it (small cross-section of the choke 111).

The evaluation device 102 is a part of a measured value acquisition device, which also comprises the measuring rod 7, the magnetic field generation device 10, and a display device, not shown, which, as a function of signals from the evaluation device, issues visual or audible signals. The evaluation device 102 detects the change in the switching state of the contacts of the measuring rod 7, derived in the event of a movement of the magnetic field generating device 10 in relation to the measuring rod 7, and determines from this the path covered by the measuring rod 7 relative to the magnetic field generating device 10, which accords with the change in the relative position of the housing parts 2, 14.

In addition to this, in the evaluation device 102 the time is detected which is required for the relative change of position of the housing parts 2, 14, between the start and end positions of a braking procedure or a venting procedure respectively. This is effected by the fact that the evaluation device 102 detects the time which passes until, starting from the contact of the measuring rod 7 which is allocated to the starting position, the contact is reached which is allocated to the end position.

In a memory element, not shown, of the evaluation device 102, reference values are deposited which are allocated to the determined values "path" and "time" respectively, and the values determined by the evaluation device 102 are then compared with these reference values. At the same time, the tolerance ranges allocated to the individual reference values are stored in the evaluation device 102.

During the operation of the spring-loaded brake 100, the evaluation device 102 compares on the one hand the path determined during a venting lift or a closure procedure of the spring-loaded brake 1, taking into account the particular tolerance range in each case with the allocated reference value. If it is turned out in this situation that the venting lift is too small to guarantee a reliable raising of the brake from the brake disk, then the evaluation device 102 issues a corresponding signal to the display device, not shown. This then generates a visual and/or audible signal, allocated to the particular fault. However, if the path covered during the venting procedure is too great, this is indicative of an erroneous setting of the limitation of the venting path, and, in turn, a corresponding warning signal is issued by the display device. If, by contrast, it is determined during a braking procedure that the brake final position reached is short of a minimum value, then a warning signal is likewise issued.

The comparison of the time which elapses during a setting procedure of the venting device and the reference values allocated to it, extended by the particular tolerance range in each case, further allows for a check to be conducted on the function of the spring-loaded brake 100 as a whole. For example, the fact that too long a period of time is required for the venting procedure indicates that the compressed air infeed is insufficient, which may be caused, for example, by an excessively low pressure of the compressed air, leaks in the device, or increased friction due to wear or dirt contamination. Likewise, the time required for the closure procedure provides information about the functional performance of the actuator device, which has the effect of closing the parking brake 100 when the compressed air is released from the air chamber 3.

In order to be able to monitor the closure behaviour of the spring-loaded brake 100, the evaluation device 102 is also able to determine the time which elapses between the beginning of a manually-initiated closure procedure and its end, and to determine from the corresponding values a specified period which must be maintained during the subsequent closure procedures. To this purpose, with the spring-loaded brake 100 vented manually beforehand, the main valve 104 is brought manually into the bleeding position by means of the actuator device 108, in which position compressed air flows out of the air chamber 3 to the outflow outlet R of the valve combination 101. The adjustable choke 111 in this situation is adjusted in such a way that the desired closure duration is achieved.

As soon as the housing parts 2, 14, have approached one another to a specific point, the evaluation device 102 begins to indicate the time which passes until a defined and always same section of the path covered during the closure of the spring-loaded brake 100 has been passed through by the housing parts 2, 14. From the time required for this specific and determined path section, the total time is calculated which must be achieved under normal conditions for the closure of the spring-loaded brake 100 under the outflow conditions specified. The predetermined time calculated in this manner forms the reference value for the further closure procedures of the spring-loaded brake 100.

By means of the measurement of the time required for the path covered during the closure procedure, for a specifically determined window, the individual specified period can be determined from the path which is actually required in each case.

In this manner, a self-learning system is created, which makes it possible, in an advantageous manner, to adapt the function of the spring-loaded brake 100 to the particular requirements in each case.

Reference Figure List

| | |
|---|---|
| 1, 100 | Spring-loaded brake |
| 2 | First housing part |
| 3 | Air chamber |
| 3a | Compressed air supply line |
| 4 | Cylinder aperture |
| 5 | Chamber |
| 6, 9 | Aperture |
| 7 | Measuring rod |
| 8 | End of the chamber 5 |
| 10 | Magnetic field generating device |
| 11 | Sleeve-shaped connection element |
| 12 | Piston |
| 13 | Piston tube section |
| 14 | Housing part |
| 15 | Valve and line block |
| 16 | Spring guide bolt |
| 16a | Head section of the spring guide bolt |
| 16b | Section of the spring guide bolt |
| 17 | Sleeve |
| 18 | Disk spring package |
| 19 | Fluid buffer |
| 20 | Central line |
| 21 | Pressure storage vessel |
| 22 | Pressure non-return valve |
| 23 | Bypass line |
| 25, 27 | Jointed journal |
| 26 | First brake caliper arm |
| 28 | Second brake caliper arm |
| 29 | Joint element |
| 30, 31 | Brake linings |
| 101 | Valve combination |
| 102 | Evaluation device |
| 103 | Pilot valve |
| 104 | Main valve |
| 105 | Choke non-return valve |
| 105a, 105b, 105c | Passage channels |
| 106 | Reset spring |
| 108 | Setting device |
| 109 | Non-return valve |
| 110, 111 | Chokes |
| 112 | Pressure monitoring device |
| 113 | Switch |
| 114, 115 | Setting screws |
| A | Connection of the valve combination 101 |
| | Third connection of the main valve 104 |

| | -continued |
|---|---|
| A' | Longitudinal axis of the housing parts 2, 14 |
| L2 | Longitudinal axis of the chamber 5 |
| P | Compressed air connection |
| R | Outflow outlet |

What is claimed is:

1. A spring-loaded brake comprising:
   a. a first housing part connected to a first brake caliper arm;
   b. a second housing part connected to a second brake caliper arm;
   c. an actuation device which moves the first and the second housing relative to one another;
   d. a measuring device, which continuously monitors the position of the housing parts relative to one another and produces measurement signals; and
   e. an evaluation device which receives the measurement signals and compares them to a reference signal, and produces evaluation signals as a function of the difference between each evaluation signal and the reference signal, said evaluation device producing a fault signal when the difference between a measurement signal and the reference signal exceeds a tolerance value.

2. The spring-loaded brake according to claim 1 wherein the actuation device acts on at least one of the housing parts by means of a fluid buffer;
   wherein pressure is exerted on the fluid buffer; and
   wherein the fluid buffer is connected to a pressure storage container in which the fluid is stored subject to pressure.

3. The spring-loaded brake according to claim 2, wherein the fluid buffer is connected to a valve device by means that relieve the fluid of pressure.

4. The spring-loaded brake according to claim 1, wherein the evaluation device determines a time required by the housing parts during a braking or venting procedure to pass from a starting position to an end position.

5. The spring-loaded brake according to claim 1 wherein the evaluation device is mounted on one of the housing parts.

6. The spring-loaded brake according to claim 1, wherein a venting device is brought from a first operational state into a second operational state by the actuation device; and
   wherein the actuator device is actuated independently of a control device.

7. The spring-loaded brake according to claim 6 wherein the actuator device actuates a slide valve in a first and in a second position,
   wherein in the first position, pressure fluid escapes from the venting device; and in a second position the fluid flows into the venting device.

8. The spring-loaded brake according to claim 7, wherein the evaluation device determines the time required for a depressurization of the venting device during the escape of the pressure fluid; and
   stores the time determined as the reference time, wherein the time is to be maintained for all subsequent closure procedure until presentation of a new reference value.

9. The device according to claim 8, wherein a pressure monitoring device is provided, and wherein the pressure monitoring device monitors the pressure of the pressure fluid contained in a supply line supplying the venting device with pressure fluid.

10. The device according to claim 9, wherein the evaluation device comprises a signal generator of an initial state.

11. The device according to claim 10, wherein the evaluation device comprises a switch actuated without a physical contact, which generates a signal on actuation.

12. The device according to claim 11, wherein the switch comprises a magnetically-sensitive switching element.

13. The device according to claim 12, wherein the evaluation device is brought into the initial state as a function of an operational state of the spring-loaded brake.

14. The device according to claim 13, wherein the evaluation device is brought into the initial state as the function of a device braked by the spring-loaded brake.

* * * * *